United States Patent
Yang et al.

(10) Patent No.: US 8,867,460 B2
(45) Date of Patent: Oct. 21, 2014

(54) TECHNIQUES TO ASSIGN IDENTIFIERS IN A WIRELESS NETWORK

(75) Inventors: Xiangying Yang, Hillsboro, OR (US); Kamran Etemad, Potomac, MD (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 673 days.

(21) Appl. No.: 12/851,756

(22) Filed: Aug. 6, 2010

(65) Prior Publication Data

US 2011/0199988 A1    Aug. 18, 2011

Related U.S. Application Data

(60) Provisional application No. 61/259,086, filed on Nov. 6, 2009.

(51) Int. Cl.
| | |
|---|---|
| *H04Q 7/00* | (2006.01) |
| *H04W 36/00* | (2009.01) |
| *H04W 12/06* | (2009.01) |
| *H04L 9/08* | (2006.01) |
| *H04L 9/32* | (2006.01) |

(52) U.S. Cl.
CPC ......... *H04W 36/0038* (2013.01); *H04W 12/06* (2013.01); *H04L 9/0838* (2013.01); *H04L 9/3273* (2013.01); *H04W 36/0066* (2013.01); *H04L 2209/80* (2013.01)
USPC .......................................... 370/329; 370/349

(58) Field of Classification Search
USPC .................................................. 370/329, 349
See application file for complete search history.

(56) References Cited

U.S. PATENT DOCUMENTS

| | | | | |
|---|---|---|---|---|
| 8,107,961 | B1 * | 1/2012 | Vargantwar et al. | 455/436 |
| 2005/0128997 | A1 * | 6/2005 | Zhao et al. | 370/349 |
| 2011/0070845 | A1 * | 3/2011 | Chen et al. | 455/91 |
| 2011/0176507 | A1 * | 7/2011 | Yuk et al. | 370/329 |

OTHER PUBLICATIONS

"Sections 16.2.1 and 16.2.8.2.1: Addressing", Part 16: Air Interface for Fixed and Mobile Broadband Wireless Access Systems, IEEE P802.16m/D5, Apr. 7, 2010, pp. 44-45 and 298.
3GPP TSG RAN WG2 #68bis: R2-10xxxx, Meeting Notes, Jan. 18-22, 2010, Valencia, Spain, 81 pages.

* cited by examiner

*Primary Examiner* — Wanda Z Russell
(74) *Attorney, Agent, or Firm* — Kacvinsky Daisak Bluni PLLC

(57) ABSTRACT

Techniques are described that can be used to assign identifiers to carriers of a multi-carrier mobile station. In some cases, each carrier of the mobile station is assigned the same identifiers. In some cases, each carrier of the mobile station is assigned a unique identifier on each channel.

17 Claims, 5 Drawing Sheets

TECHNIQUES TO ASSIGN IDENTIFIERS IN A WIRELESS NETWORK

RELATED APPLICATION

This application claims the benefit of U.S. Provisional Application No. 61/259,086, filed Nov. 6, 2009.

FIELD

The subject matter disclosed herein relates generally to techniques to assign identifiers to mobile stations in a wireless network.

RELATED ART

In IEEE 802.16m and Long Term Evolution (LTE) compliant networks, a unique identifier is assigned to each mobile station (MS) in a cell. A cell can be defined in numerous ways. For example, a cell can be defined based on a frequency partition. In addition, a single frequency can have multiple sectors. For example, a sector can be 120 degree angle regions. When a MS moves to a new cell, the MS typically surrenders its identifier and receives a new identifier in the new cell.

For networks such as IEEE 802.16m and 3GPP LTE-Advance, a feature called multi-carrier (MC) operation can be used whereby a base station (BS) and MS are able to operate on multiple carrier frequencies. An MS can receive resources on multiple carrier frequencies. The MS has an identifier (ID) on each carrier frequency. The MC-capable BS and MS can each have multiple physical layer interfaces (PHYs) and a single media access controller. From the network point view, a single physical BS will handle a much larger number of connected mobile stations in its coverage area, which is proportional to the number of PHY carriers the BS is covering.

Typically, a unique ID is assigned for each MS covered by a BS. There may be insufficient number of station identifiers (STID) to support a very large number of MSs in the MC deployment scenario. Defining a larger STID space may be a solution but can be undesirable because it increases overhead used to manage station identifiers.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
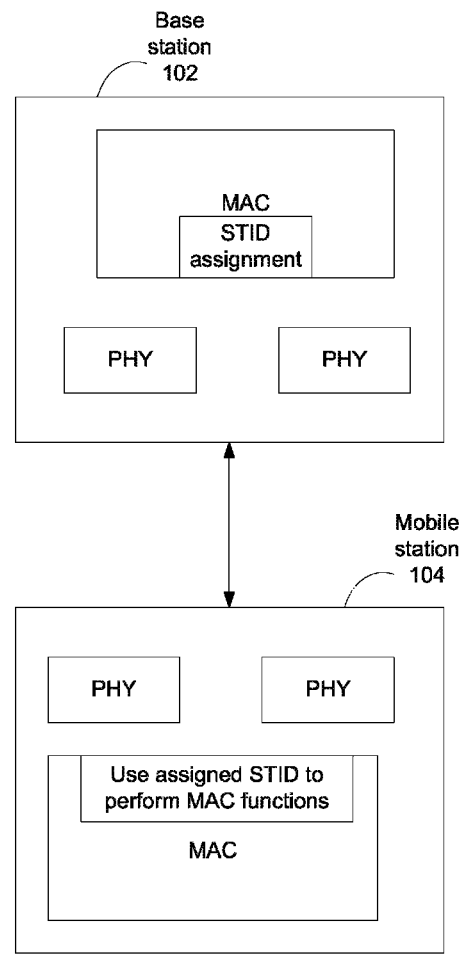
FIG. 1 depicts an example of a system with a base station and a mobile station.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Various embodiments provide for schemes to assign identifiers to multi-carrier (MC) capable mobile stations. In some cases, a mobile station is assigned a unique identifier on each carrier frequency that the mobile station operates on. In some cases, the mobile station is assigned the same identifier on each carrier frequency that the mobile station operates on. Single carrier mobile stations that operate on the same carrier frequencies as those of the multi-carrier mobile station are assigned identifiers that do not conflict with identifiers assigned to the multi-carrier mobile station. Identifiers can be assigned to mobile stations on a first-come, first-served basis.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks. IEEE 802.11x may refer to any existing IEEE 802.11 specification, including but not limited to IEEE 802.11a, 802.11b, 802.11e, 802.11g, 802.11h, 802.11i, and 802.11n as well as any version or draft of IEEE 802.16e and IEEE 802.16m.

FIG. 1 depicts an example of a system with a base station 102 and a mobile station 104. Mobile station 104 is capable of communication on multiple frequencies. Base station 102 is to assign identifiers to mobile station 104 for each carrier frequency on which mobile station 104 communicates. A media access controller (MAC) of mobile station 104 stores the assigned identifier to perform basic media access controller operations such as identifying control information and data burst relevant to mobile station 104. The MAC of base station 102 stores identifier assignments for each carrier of each mobile station. Although multiple PHYs are shown for each of base station 102 and mobile station 104, a single PHY can be used by each or both of base station 102 and mobile station 104.

Figure 2:
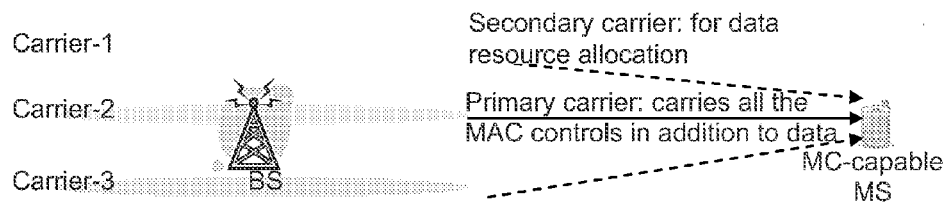
FIG. 2 shows an example of multi-carrier (MC) mobile station (MS) operation mode.

FIG. 2 shows an example of multi-carrier (MC) mobile station (MS) operation mode. In this example, the MS operates on three carriers: carriers 1-3. In this example, carrier 2 is a primary carrier whereas carriers 1 and 3 are secondary carriers. As described in section 16.2.8 of IEEE 802.16m draft 5 (2010), the primary carrier is used to transmit MAC signaling and commands such as those related to handover, sleep, idle, security update, and so forth. As described in section 16.2.8 of IEEE 802.16m draft 5 (2010), the secondary carriers can be used for resource allocation. For addressing purposes, the MC MS is to have station identifiers on all carriers on which the MC MS operates. Single-carrier (SC) mode MS is a form of an MC MS that uses only one carrier (i.e., a primary carrier). The base station assigns the IDs to each carrier that the MS uses and the MS uses an ID for each assigned carrier.

A control plane includes MAC controls exchanged between the BS and MS. In the example of FIG. 2, the control plane communicates via the primary carrier, namely carrier-2. The BS control plane allocates the ID to the MS during MS initiation entry/re-entry to its cell. The MS control plane remembers the ID assignment so that the MS can process the communications intended for the MS.

For an MC BS with a single media access control state machine, the BS uniquely identifies all MC-mode MS and SC-mode MS on all its carriers. One approach is to assign each MS a unique STID, where the uniqueness is guaranteed across all carriers on this MC BS, regardless of whether the MS operates on multiple carriers or a single carrier. No matter how the MC-capable MS is changing the carriers it is operating on from time to time, STID uniqueness is still maintained without re-configuration. However, unique STIDs may not be available for all MSs when the number of connected MSs becomes very large, particularly when each MS has a unique STID common on each carrier frequency. In such case, the BS can run out of available STID space.

Figure 3:
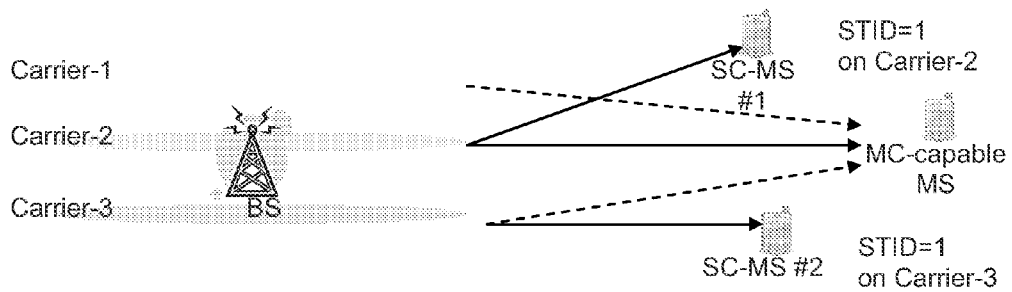
FIGS. 3-5 depict examples of manners of assigning identifiers to a mobile station that is capable of operating on multiple carriers.

Various embodiments assign the same STID to SC MS that use different carrier frequencies, even if they are covered by a single BS MAC. As shown in FIG. 3, SC MS#1 operates on carrier 2 and SC MS#2 operates on carrier 3. The BS can assign the same STID (in this case, STID=1) to each of these two MSs without confusion to either side because MS #1 and #2 operate on different carriers. An MC-capable MS operates on any of carriers 1-3. Various identifiers can be assigned to an MC-capable MS. Techniques for assigning identifiers to the MC-capable MS are described herein.

Figure 4:
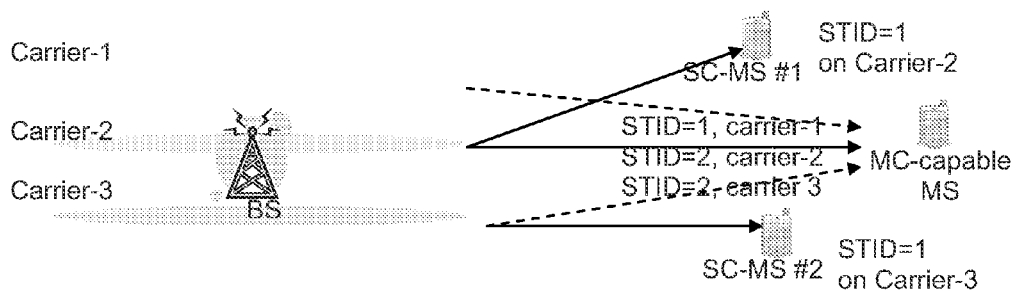

FIG. 4 depicts an example in which the MC-capable MS is assigned a different ID on each carrier. However, the MC-capable MS has to maintain three different STIDs and remember the STID used for each carrier. The BS also has to remember STID for each carrier on which an MS communicates. If the MC MS adds an operating component carrier, a new STID, unique on the added carrier, is assigned for the MC MS for that added carrier. If there is a primary carrier switch, the network control plane may also have to update the STID of the primary carrier. If this SC MS is switched from one carrier to a new carrier (via carrier switching or handover procedure) and the original STID causes a conflict on the new carrier, such reuse pattern causes the BS to update STID assignment for an SC MS. It should be noted that, however, this complexity can achieve the most efficient usage of the STID space, because, for each carrier, all STID can be used without being wasted.

Figure 5A:
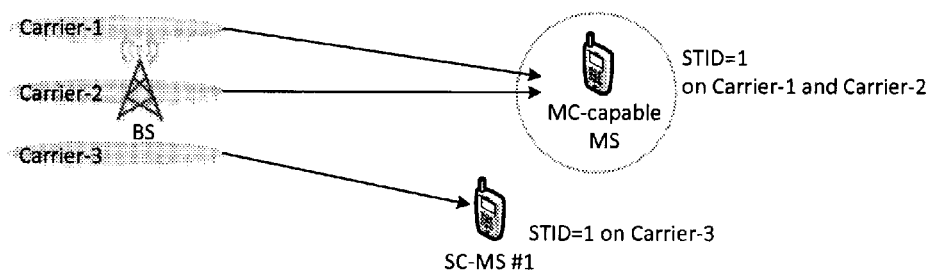
Figure 5B:
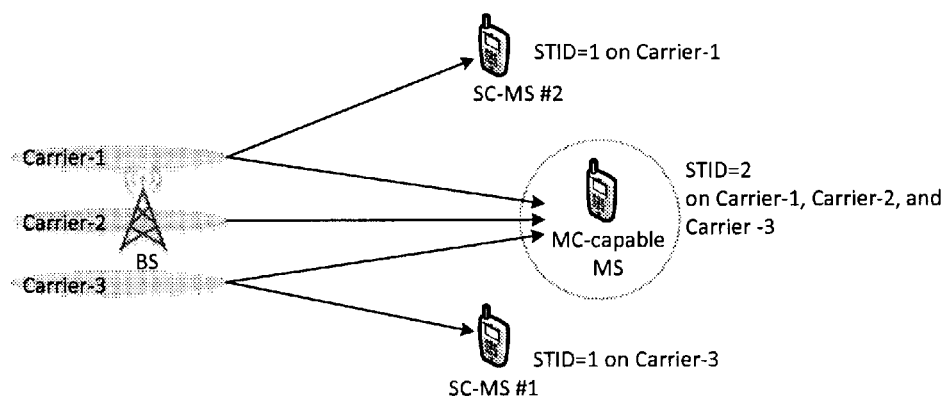

FIGS. 5A and 5B depict examples in which the MC-capable MS is assigned the same ID on each carrier. Accordingly, SC MS on each carrier are assigned different IDs than those assigned to the MC-capable MS. This can simplify the MAC operation for both BS and MS because each MS has one ID to maintain, although the BS still needs to know the binding of the STID to each specific carrier. There can be a lower usage of STID space when many MSs in the network are SC MS. Using this technique, there is no need to assign/release STID when MC MS adds or removes component carriers. In addition, a BS control plane does not need to update the STID of a MC-capable MS when there is a primary carrier switch. But the BS may need to update the STID of an SC MS if it changes its operating carrier from one to another operating carrier.

In some cases, when an MC-capable MS operates on one carrier and then adds other carriers, the MC may not be able to have the same STID on other carriers. For example, in FIG. 5A, the MC-capable MS may not be able to have STID 1 on Carrier-3. In some cases, according to the techniques of FIG. 4, the MC-capable MS is provided with another STID on the added carrier. In some cases, according to the techniques of FIG. 5B, the MC-capable MS is re-configured with another STID which is unique on all previously used carriers as well as the added carrier. In the example of FIG. 5B, the MC-capable MS is re-configured with STID 2.

In some cases, when an MC-capable MS only operates on one carrier, the MC-capable MS is assigned the same STID on all carriers even if secondary carriers are not used.

In some cases, regardless of whether an MS operates as SC or MC, a unique ID is assigned to each channel on which the MS does or could operate. However, if a network does not have any MC MS, then the number of available STIDs are reduced by N−1/N compared to the efficient but more complex scheme described in techniques of FIG. 4, where N is a number of carriers a network deploys.

Figure 6:
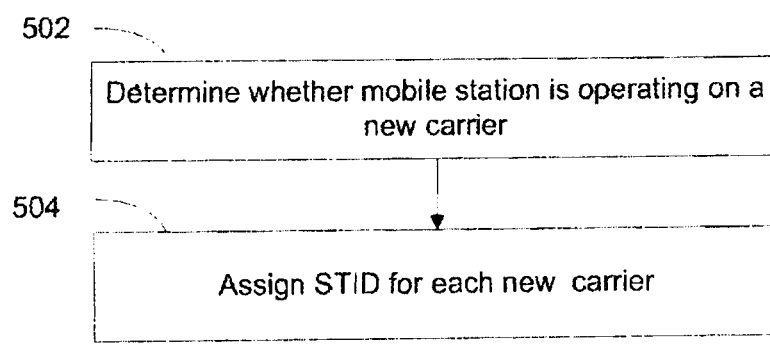
FIG. 6 depicts an example process in accordance with an embodiment.

FIG. 6 depicts an example process in accordance with an embodiment.

Block 502 includes determining whether a mobile station operates on a new carrier frequency.

Block 504 includes assigning a station ID to the mobile station for each new carrier of. Various manners of assigning identifiers can take place. For example, the ID assigned to the carrier can be the same ID as assigned to other carriers of the same mobile station. In some cases, the ID is unique on the new carrier but can be different than IDs on other carriers of the same mobile station.

Figure 7:
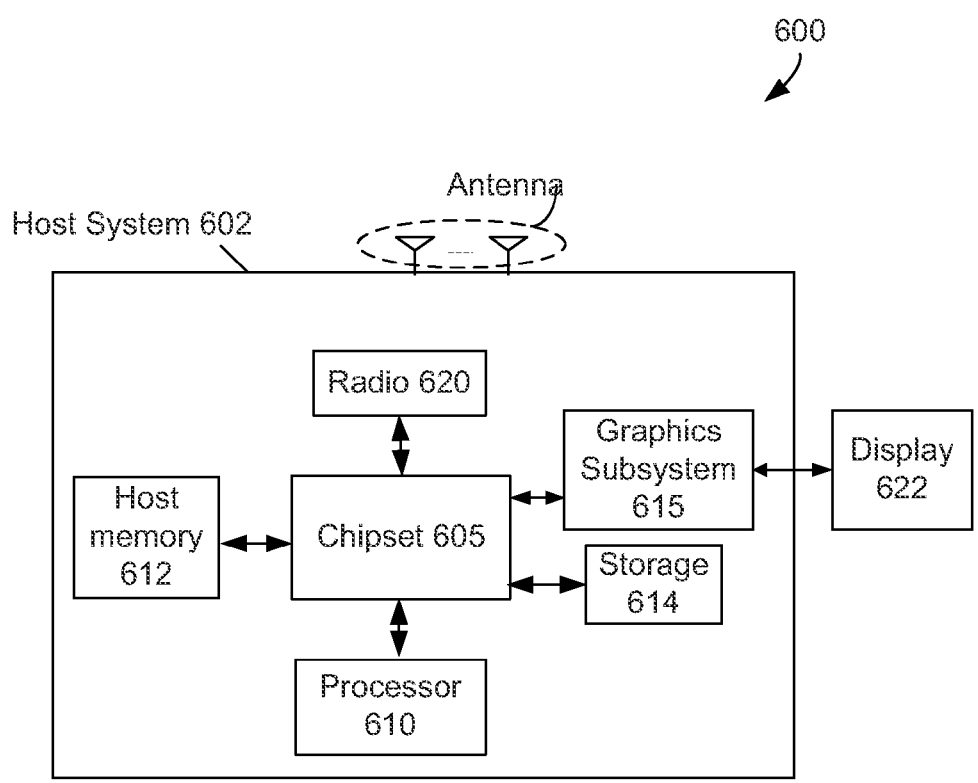
FIG. 7 depicts an example of a mobile station in accordance with an embodiment.

FIG. 7 depicts an example of a mobile station in accordance with an embodiment. Computer system 600 may include host system 602 and display 622. Computer system 600 can be implemented in a handheld personal computer, mobile telephone, set top box, or any computing device. Any type of user interface is available such as a keypad, mouse, and/or touch screen. Host system 602 may include chipset 605, processor 610, host memory 612, storage 614, graphics subsystem 615, and radio 620. Chipset 605 may provide intercommunication among processor 610, host memory 612, storage 614, graphics subsystem 615, and radio 620. For example, chipset 605 may include a storage adapter (not depicted) capable of providing intercommunication with storage 614.

Processor 610 may be implemented as Complex Instruction Set Computer (CISC) or Reduced Instruction Set Computer (RISC) processors, x86 instruction set compatible processors, multi-core, or any other microprocessor or central processing unit. Processor 610 can be configured to allocate and configure/re-configure the IDs. The assigned IDs may be stored in either memory or storage.

Host memory 612 may be implemented as a volatile memory device such as but not limited to a Random Access Memory (RAM), Dynamic Random Access Memory (DRAM), or Static RAM (SRAM). Storage 614 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 615 may perform processing of images such as still or video for display. An analog or digital interface may be used to communicatively couple graphics subsystem 615 and display 622. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

Radio 620 may include one or more radios capable of transmitting and receiving signals in accordance with applicable wireless standards such as but not limited to any version of IEEE 802.11 and IEEE 802.16. For example, radio 620 may include at least a physical layer interface and media access controller.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   assigning, by a base station, a first identifier to a multi-carrier mobile station for communicating on first and second carriers of the base station;
   assigning the first identifier to a first single-carrier mobile station for communicating on a third carrier of the base station; and
   when the third carrier is added to the multi-carrier mobile station:
      reassigning the first identifier to a second single-carrier mobile station for communicating on either the first carrier or the second carrier; and
      assigning a second identifier to the multi-carrier mobile station for communicating on the first, second, and third carriers.

2. The method of claim 1, wherein the assigning the first identifier to the first single-carrier mobile station takes place in response to the first single-carrier mobile station entering or re-entering a cell.

3. The method of claim 1, wherein the first identifier and the second identifier both comprise station identifiers.

4. A method comprising:
   receiving, by a multi-carrier mobile station, an assignment of a first identifier on first and second carriers of a multi-carrier base station;
   adding a third carrier of the multi-carrier base station; and
   when the first identifier has been assigned to another mobile station for communicating on the third carrier:
      receiving an assignment of a second identifier; and
      communicating on the first, second, and third carriers using the second identifier.

5. The method of claim 4, further comprising:
   applying the first identifier for media access control communications.

6. The method of claim 4, wherein the first identifier and the second identifier both comprise station identifiers.

7. The method of claim 4, comprising, when the first identifier has not been assigned to another mobile station for communicating on the third carrier, communicating on the first, second, and third carriers using the first identifier.

8. A mobile station comprising:
   a processor circuit;
   a media access control (MAC) logic;
   logic for execution by the processor circuit to access an assignment of a first identifier to the mobile station for communicating on first and second carriers of a multi-carrier base station;
   logic for execution by the processor circuit to add a third carrier of the multi-carrier base station; and
   logic for execution by the processor circuit to, when the first identifier has been assigned to another mobile station for communicating on the third carrier:

access an assignment of a second identifier; and
communicate on the first, second, and third carriers using the second identifier.

9. The apparatus of claim 8, wherein the first identifier and the second identifier both comprise station identifiers.

10. The apparatus of claim 8, further comprising logic to use the first identifier on the first carrier as an identifier for use on the second carrier without receipt of an assignment of another identifier for use on the second carrier in response to the mobile station operating as a multi-carrier mobile station.

11. The apparatus of claim 8, further comprising:
logic to apply the first identifier for media access control communications.

12. The mobile station of claim 8, comprising logic for execution by the processor circuit to, when the first identifier has not been assigned to another mobile station for communicating on the third carrier, communicate on the first, second, and third carriers using the first identifier.

13. A system comprising:
a display device;
a radio; and
a host system comprising:
 a media access control (MAC) logic,
 logic to access an assignment of a first identifier to the system for use to communicate over first and second carriers of a multi-carrier base station;
 logic to add a third carrier of the multi-carrier base station; and
 logic to, when the first identifier has been assigned to another system for use to communicate over the third carrier:
  access a reassignment of the first identifier; and
  communicate on the first, second, and third carriers using the second identifier.

14. The system of claim 13, further comprising:
logic to apply the first identifier for media access control communications.

15. The system of claim 13, further comprising logic to use the first identifier on the first carrier as an identifier for use on the second carrier without receipt of another assignment of an identifier for use on the second carrier in response to the system operating as a multi-carrier mobile station.

16. The system of claim 13, wherein the first identifier and the second identifier both comprise station identifiers.

17. The system of claim 13, the host system comprising logic to, when the first identifier has not been assigned to another system for use to communicate over the third carrier, communicate over the first, second, and third carriers using the first identifier.

* * * * *